United States Patent
Kong

(10) Patent No.: US 9,432,447 B2
(45) Date of Patent: Aug. 30, 2016

(54) DOCUMENT DISTRIBUTION SYSTEM AND METHOD USING WEBDAV PROTOCOL

(71) Applicant: SAMSUNG ELECTRONICS CO., LTD., Suwon-si, Gyeonggi-do (KR)

(72) Inventor: Tae-kook Kong, Burlington (CA)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

(21) Appl. No.: 14/813,770

(22) Filed: Jul. 30, 2015

(65) Prior Publication Data

US 2015/0341426 A1 Nov. 26, 2015

Related U.S. Application Data

(63) Continuation of application No. 13/561,216, filed on Jul. 30, 2012, now Pat. No. 9,123,026, which is a continuation of application No. 11/501,895, filed on Aug. 10, 2006, now Pat. No. 8,260,853.

(30) Foreign Application Priority Data

Sep. 23, 2005 (KR) .................. 10-2005-0088681

(51) Int. Cl.
*H04L 29/08* (2006.01)
*H04L 29/06* (2006.01)
(Continued)

(52) U.S. Cl.
CPC ............. *H04L 67/10* (2013.01); *G06F 3/0484* (2013.01); *G06Q 10/10* (2013.01); *H04L 67/42* (2013.01); *H04N 1/00204* (2013.01); *H04N 1/00209* (2013.01); *H04N 1/00217* (2013.01);
(Continued)

(58) Field of Classification Search
None
See application file for complete search history.

(56) References Cited

U.S. PATENT DOCUMENTS 6,684,227 B2 * 1/2004 Duxbury ............. G06F 17/3089
2001/0011341 A1 8/2001 Hayes Jr. et al.
(Continued)

FOREIGN PATENT DOCUMENTS

JP 7-121325 5/1995
JP 2001-217983 8/2001
(Continued)

OTHER PUBLICATIONS

Office Action mailed Nov. 16, 2006 issued in Korean Patent Application No. 10-2005-0088681.
(Continued)

*Primary Examiner* — Jenee Williams
(74) *Attorney, Agent, or Firm* — Staas & Halsey LLP

(57) ABSTRACT

A document distribution system and method using a WebDAV protocol. The system includes a WebDAV server and an image forming apparatus configured to scan a document and transmit the scanned document to the WebDAV server by using the WebDAV protocol. The image forming apparatus includes a user interface operable to provide a dialog box including a first user input field to enable a user to designate a Uniform Resource Locator (URL) of the WebDAV server and a second user input field to enable the user to designate a directory of the WebDAV server so as to specify a document storing location within the WebDAV server, the dialog box to provide a connection to the WebDAV server to transmit a document to the WebDAV server using the WebDAV protocol. The image forming apparatus transmits the scanned document to a directory of the WebDAV server designated by using the user interface.

7 Claims, 2 Drawing Sheets

(51) Int. Cl.
  *H04N 1/00* (2006.01)
  *G06F 3/0484* (2013.01)
  *G06Q 10/10* (2012.01)
(52) U.S. Cl.
  CPC ........... *H04N1/00244* (2013.01); *H04L 29/06* (2013.01); *H04L 67/02* (2013.01)

(56) References Cited

U.S. PATENT DOCUMENTS

| | | | |
|---|---|---|---|
| 2001/0054106 A1* | 12/2001 | Anderson | H04L 29/06 709/227 |
| 2002/0059360 A1* | 5/2002 | Ito | H04L 29/06 709/203 |
| 2002/0078432 A1* | 6/2002 | Charisius | G06Q 10/06 717/102 |
| 2002/0087667 A1* | 7/2002 | Andersen | G06F 17/30899 709/220 |
| 2002/0107914 A1* | 8/2002 | Charisius | G06Q 10/06 709/203 |
| 2002/0188597 A1* | 12/2002 | Kern | G06Q 10/06 |
| 2003/0046366 A1* | 3/2003 | Pardikar | H04L 29/06 709/219 |
| 2003/0093556 A1* | 5/2003 | Yeung | H04L 29/06 709/238 |
| 2003/0167317 A1* | 9/2003 | Deen | H04L 29/06 709/219 |
| 2003/0200234 A1* | 10/2003 | Koppich | G06F 17/30011 |
| 2003/0200266 A1* | 10/2003 | Henry | H04L 29/06 709/206 |
| 2003/0200503 A1* | 10/2003 | Koppich | G06F 17/30011 715/255 |
| 2003/0208565 A1* | 11/2003 | Nishihara | H04L 63/08 709/219 |
| 2004/0100554 A1* | 5/2004 | Vanderwilt | H04N 7/147 348/14.08 |
| 2004/0167983 A1* | 8/2004 | Friedman | H04L 29/06 709/227 |
| 2004/0172586 A1 | 9/2004 | Ragnet et al. | |
| 2004/0243924 A1* | 12/2004 | Fujita | G06F 17/30899 715/205 |
| 2004/0257614 A1* | 12/2004 | Tanimoto | H04L 29/06 358/1.15 |
| 2005/0108353 A1 | 5/2005 | Yamamoto | |
| 2006/0129942 A1* | 6/2006 | McCary | G06Q 10/10 715/741 |
| 2006/0168136 A1* | 7/2006 | Bethlehem | H04L 63/102 709/219 |
| 2006/0168512 A1* | 7/2006 | Wilson | H04L 67/2804 715/234 |
| 2006/0195465 A1 | 8/2006 | Atchison et al. | |
| 2006/0203274 A1* | 9/2006 | Hirose | G06F 3/1207 358/1.13 |
| 2008/0215960 A1* | 9/2008 | Fujita | G06F 17/30899 715/205 |
| 2009/0070291 A1* | 3/2009 | Tadayon | G06F 17/30067 |
| 2009/0083440 A1* | 3/2009 | Kawakami | G06F 15/16 709/245 |

FOREIGN PATENT DOCUMENTS

| | | |
|---|---|---|
| JP | 2003-198819 | 7/2003 |
| JP | 2004-341955 | 12/2004 |
| KR | 2001-48906 | 6/2001 |
| KR | 2005-79278 | 8/2005 |

OTHER PUBLICATIONS

Office Action issued Feb. 11, 2009 in U.S. Appl. No. 11/501,895.
Office Action issued Aug. 12, 2009 in U.S. Appl. No. 11/501,895.
Office Action issued Jan. 27, 2010 in U.S. Appl. No. 11/501,895.
Office Action issued May 19, 2010 in U.S. Appl. No. 11/501,895.
Office Action issued Oct. 25, 2010 in U.S. Appl. No. 11/501,895.
Office Action issued Apr. 25, 2011 in U.S. Appl. No. 11/501,895.
Office Action issued Nov. 7, 2011 in U.S. Appl. No. 11/501,895.
Notice of Allowance issued Apr. 30, 2012 in U.S. Appl. No. 11/501,895.
Office Action issued Nov. 6, 2013 in copending U.S. Appl. No. 13/561,216.
Final Office Action issued Jul. 7, 2014 in copending U.S. Appl. No. 13/561,216.
Office Action issued Dec. 19, 2014 in copending U.S. Appl. No. 13/561,216.
Notice of Allowance issued Apr. 15, 2015 in copending U.S. Appl. No. 13/561,216.
U.S. Appl. No. 13/561,216, filed Jul. 30, 2012, Tae-kook Kong, Samsung Electronics Co., Ltd.

\* cited by examiner

DOCUMENT DISTRIBUTION SYSTEM AND METHOD USING WEBDAV PROTOCOL

CROSS-REFERENCE TO RELATED APPLICATIONS

This application is a continuation of prior U.S. application Ser. No. 13/561,216, filed on Jul. 30, 2012, which is a continuation of prior U.S. application Ser. No. 11/501,895, filed on Aug. 10, 2006 in the United States Patent and Trademark Office, now U.S. Pat. No. 8,260,853 patented on Sep. 4, 2012, which claims the benefit of Korean Patent Application No. 10-2005-0088681, filed on Sep. 23, 2005, in the Korean Intellectual Property Office, the disclosures of which are incorporated herein in their entirety by reference.

BACKGROUND OF THE INVENTION

1. Field of the Invention

The present general inventive concept relates to a document distribution system and method using a World Wide Web Distributed Authorizing and Versioning (NebDAV) protocol, and more particularly, to a system and method of transmitting a document to a WebDAV server using a WebDAV protocol and distributing the document to several clients.

2. Description of the Related Art

World Wide Web Distributed Authorizing and Versioning (WebDAV) is an Internet engineering task force (IETF) standard for supporting collaborative document authoring on the Internet, and is a Hyper Text Transfer Protocol (HTTP) extension that allows multiple authors to collaboratively edit and manage files remotely on the Internet. It is expected that WebDAV can satisfy an initial goal for collaborative web authoring by adding a write property to a read property of the HTTP. It is also expected that WebDAV allows the multiple authors to collaboratively work on a document on the web in the same manner as performed through the intranet of a company.

Conventionally, a file transport protocol (FTP) has been widely used to transfer files in a document distribution system. To transfer the files in the conventional document distribution system, the FTP has been additionally installed in a server. Moreover, the FTP does not have functions to edit original documents to be transmitted and to set various properties of the document. Thus, a document distribution system using a WebDAV protocol having the above functions is needed.

SUMMARY OF THE INVENTION

The present general inventive concept provides a method and apparatus to transmit a document to a specific folder of a document distribution system using a World Wide Web Distributed Authorizing and Versioning (WebDAV) protocol and to distribute the document to several clients in order to configure the document distribution system without installing an additional file transmission protocol (FTP) in a server and transmit the document after setting various properties of the document without editing the document.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a document distribution system using a WebDAV protocol, including a WebDAV server, and a first client to transmit a document to the WebDAV server using the WebDAV protocol, wherein the first client transmits the document to a predetermined directory of the WebDAV server.

The WebDAV server and the first client may generate a user interface to designate document information and a document level property.

The user may designate the document information and the document level property through the first client or a web server connected to the first client.

The WebDAV server may re-transmit the document transmitted to the directory to a second directory designated according to the document information and document level property.

The system may further include a second client to access the directory designated based on the document information and the document level property according to authority information thereof.

The foregoing and/or other aspects and utilities of the present general inventive concept may also be achieved by providing a method of a document distribution system using a WebDAV protocol, the method including scanning the document by a first client, transmitting the document to a WebDAV server from the first client using the WebDAV protocol, wherein the first client transmits the document to a predetermined directory of the WebDAV server.

The designating of the information and the level property may further include designating information and a level property of the document.

A user may designate the document information and the document level property through the first client or a web server connected to the first client.

The method may further include re-transmitting the document to a directory designated according to the document information and the document level property, after designating the document information and document level property by the WebDAV server after the designating of the document information and the document level property.

The method may further include accessing the directory designated according to the document information and the document level property by a second client after the retransmitting of the document and determining whether or not the second client accesses the directory according to authority information thereof.

The foregoing and/or other aspects and utilities of the present general inventive concept may also be achieved by providing a document distribution system, including a server including a first directory to store a document according to location information and a document level property thereof and a first client to set a second document level property and second document information of the document, to transmit the second document level property and the second document information of the document according to a WebDAV protocol, so that the document is transmitted to a second directory of the server.

The foregoing and/or other aspects and utilities of the present general inventive concept may also be achieved by providing a document distribution system, including a WebDAV server to store a document in a predetermined directory thereof, to receive document storing information and level property of the document received according to a WebDAV protocol, and to store the document in a second predetermined directory according to the received document storing information and the level property.

The foregoing and/or other aspects and utilities of the present general inventive concept may also be achieved by providing a document distribution system that uses a WebDAV protocol, including a first location to transmit a document to a WebDAV server using a WebDAV protocol such that the first location can optionally set a document storing location together with predetermined information of the document and a plurality of second locations to access the document storing location based on the predetermined information of the document set by the first location.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figures 1, 2:
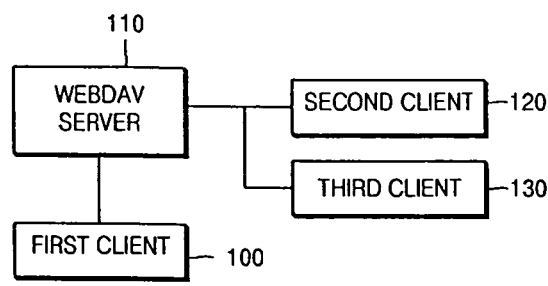
FIG. 1 is a block diagram illustrating a document distribution system using a WebDAV protocol, according to an embodiment of the present general inventive concept.
FIG. 2 is a view illustrating a user interface to set a document storing location and document information in the document distribution system of FIG. 1.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a document distribution system using a World Wide Web Distributed Authorizing and Versioning (WebDAV) protocol, according to an embodiment of the present general inventive concept. Referring to FIG. 1, the document distribution system using the WebDAV protocol includes a first client 100, a WebDAV server 110, a second client 120, and a third client 130.

The first client 100 transmits a document to the WebDAV server 110 using the WebDAV protocol. In Furthermore, the first client 100 can transmit the document to a predetermined directory of the WebDAV server 110.

A user can set document information and a document level property of the document through the first client 100 or a web server, such as the WebDAV server 110, connected to the first client 100.

FIG. 2 is a view illustrating a user interface to set a document storing location and the document information of a document in the document distribution system of FIG. 1. Referring to FIGS. 1 and 2, the user interface includes a document storing location interface 210 to set the document storing location and a document information interface 220 to set the document information. The user interface to set the document storing location 210 may include a server uniform resource locator (URL) or a directory of the WebDAV server that can be set to store the document. An author's name, an author's e-mail address, a document level, and a date of creating the document may be set as the document information, which is set through the document information interface 220. In addition, a brief memo regarding the document can also be stored through the document information interface 220. The user interface may be generated by either one of the WebDAV 110 and the first client 100. A user may input data to the user interface.

The WebDAV server 110 transmits the document previously transmitted to the URL or the directory of the WebDAV server to a directory that is designated based on the document information and document level property.

The second and third clients 120 and 130 can access the designated directory based on the document information and the document level property according to authority information thereof.

Figure 3:
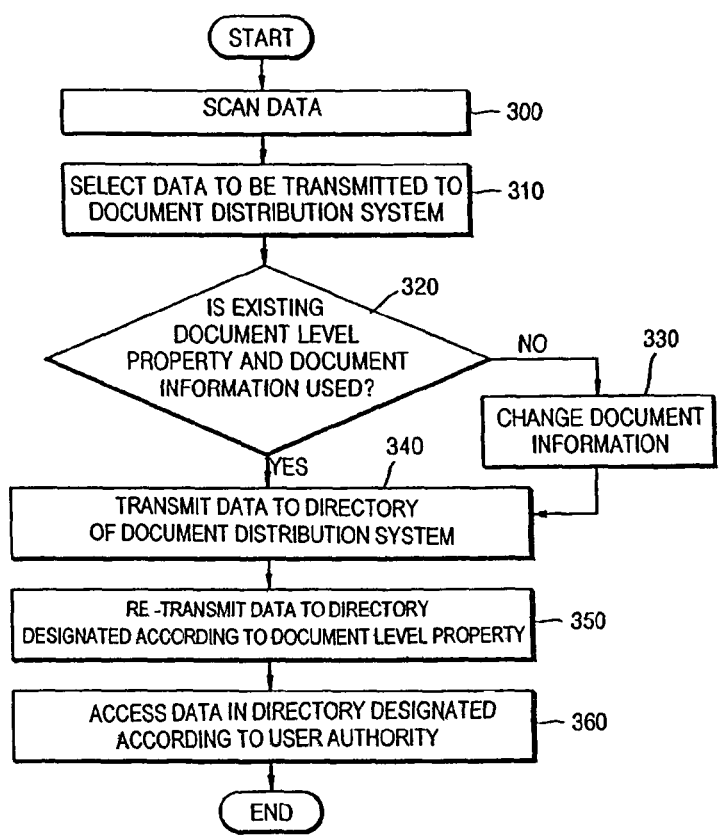
FIG. 3 is a flowchart illustrating a method of distributing a document using a WebDAV protocol, according to an embodiment of the present general inventive concept.

FIG. 3 is a flowchart illustrating a method of distributing a document using a WebDAV protocol such as the one illustrated in FIG. 1, according to an embodiment of the present general inventive concept Referring to FIGS. 1 through 3, the first client 100 scans data to be transmitted to the WebDAV server 110 (Operation 300). The data may be a document having document information and a document level property. The first client 100 selects the data to be transmitted to a document distribution system (Operation 310). The first client 100 may use the user interface of FIG. 2 to select the data. The first client 100 determines whether to use the existing document level property and document information of the data to be transmitted (Operation 320). When it is determined that the first client 100 does not use the existing document level property and document information, but instead decides to update the data to a new document level property and document information, the first client 100 changes the document information and document level property (Operation 330). When setting the storing location and information of the data, the server URL and the directory of the WebDAV server may be set to store the data. Also, the author's name, the author's e-mail address, the document level, and the date of creating the document can be set as the document information. In addition, the brief memo regarding the data can also be stored along with the document information.

When it is determined that the first client 100 uses the existing document information or the new document information, the first client 100 transmits the data and the document information to the predetermined directory of the document distribution system (Operation 340).

The WebDAV server 110 determines the document level property based on the document information of the transmitted data, and re-transmits the data to directories designated according to the document level property (Operation 350).

A user's authority for the second client 120 or the third client 130 is designated. The authority information for the second or third clients 120 and 130 can be designated by the user's authority. According to the user's authority, the second client 120 or the third client 130 can access the data in the directory designated according to the document level properties (Operation 360).

The embodiments of the present general inventive concept can be written as computer programs and can be implemented in general-use digital computers that execute the programs using a computer readable recording medium. Examples of the computer readable recording medium include magnetic storage media e.g., ROM, floppy disks, hard disks, etc., optical recording media e.g., CO-ROMs, or DVDs, and storage media such as carrier waves e.g., transmission through the Internet.

As described above, a document is transmitted to a specific folder of a document distribution system using a WebDAV protocol, so that a document distribution system can be configured without installing an additional file transmission protocol in a server. Also, various properties of data can be designated without modifying the data when transmitting the document.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A document distribution system using a World Wide Web Distributed Authorizing and Versioning (WebDAV) protocol, comprising:
a WebDAV server; and
an image forming apparatus configured to scan a document and transmit the scanned document to the WebDAV server by using the WebDAV protocol,
wherein the image forming apparatus includes a user interface operable to provide a dialog box including a first user input field to enable a user to designate a Uniform Resource Locator (URL) of the WebDAV server and a second user input field to enable the user to designate a directory of the WebDAV server so as to specify a document storing location within the WebDAV server, the dialog box to provide a connection to the WebDAV server to transmit the scanned document to the WebDAV server using the WebDAV protocol,
wherein the image forming apparatus transmits the scanned document to a-the designated directory of the WebDAV server which is designated by using the user interface, and
wherein the WebDAV server automatically re-transmits the scanned document in the designated directory in the WebDAV server to a second directory based on a document level property of the document.

2. The document distribution system of claim 1, wherein a user designates the document level property using one of the WebDAV server and the image forming apparatus.

3. The document distribution system of claim 1, wherein one of the WebDAV server and the image forming apparatus generates another dialog box to designate the document level property of the designated document.

4. The document distribution system of claim 1, wherein the WebDAV server determines whether a client is allowed to access the document in the WebDAV server based on the document level property of the designated document.

5. An image forming apparatus coupled to a WebDAV server via a network, the image forming apparatus comprising:
a scanner configured to scan a document;
a user interface configured to provide a dialog box including a first user input field to enable a user to designate a Uniform Resource Locator (URL) of the WebDAV server and a second user input field to enable the user to designate a directory of the WebDAV server so as to specify a document storing location within the WebDAV server; and
a controller configured to determine whether to use an existing document level property and existing document information to determine a directory of the WebDAV server,
wherein upon determining to use the existing document level property and the existing document information, the controller transmits the scanned document to the directory of the WebDAV server determined by using the existing document level property and the existing document information, and upon determining not to use the existing document level property and the existing document information, the controller transmits the scanned document to the directory of the WebDAV server designated by using the user interface, and
wherein the dialog box provides a connection between the image forming apparatus and the WebDAV server for transmitting a document by using the WebDAV protocol.

6. The image forming apparatus of claim 5, wherein one of the WebDAV server and the image forming apparatus generates a user interface to designate document information and a document level property of the document.

7. The image forming apparatus of claim 5, wherein a user designates document information and a document level property through a first client or a web server connected to the first client.

* * * * *